United States Patent
Dayal

(10) Patent No.: US 12,039,258 B2
(45) Date of Patent: Jul. 16, 2024

(54) METHOD AND SYSTEM FOR DYNAMIC NAMING OF COMPONENT EXPRESSIONS WITHIN A FORMULA IN A CELL IN A SPREADSHEET APPLICATION

(71) Applicant: Dayal Family LLC, Chicago, IL (US)

(72) Inventor: Sandeep Dayal, Chicago, IL (US)

(73) Assignee: DAYAL FAMILY LLC, Chicago, IL (US)

(*) Notice: Subject to any disclaimer, the term of this patent is extended or adjusted under 35 U.S.C. 154(b) by 0 days.

(21) Appl. No.: 16/599,895

(22) Filed: Oct. 11, 2019

(65) Prior Publication Data

US 2024/0070382 A1  Feb. 29, 2024

Related U.S. Application Data

(60) Provisional application No. 62/745,760, filed on Oct. 15, 2018.

(51) Int. Cl.
G06F 40/18       (2020.01)
G06F 16/903      (2019.01)
G06F 40/205      (2020.01)

(52) U.S. Cl.
CPC ............ *G06F 40/18* (2020.01); *G06F 16/903* (2019.01); *G06F 40/205* (2020.01)

(58) Field of Classification Search
CPC ............................... G06F 40/18; G06F 40/205
See application file for complete search history.

(56) References Cited

U.S. PATENT DOCUMENTS 5,987,481 A      11/1999  Michelman et al.
7,266,763 B2 *   9/2007   Peyton-Jones .......... G06F 40/18
                                                     715/764

(Continued)

FOREIGN PATENT DOCUMENTS

EP       1178414 A1 *    2/2002  ........... G06F 17/246
WO   WO-2008107665 A2 *  9/2008  ........... G06F 17/246

OTHER PUBLICATIONS

A. G. Yoder and D. L. Cohn, "Real spreadsheets for real programmers," Proceedings of 1994 IEEE International Conference on Computer Languages (ICCL'94), 1994, pp. 20-30, doi: 10.1109/ICCL.1994.288396. URL: https://ieeexplore.ieee.org/stamp/stamp.jsp?tp=&arnumber=288396&isnumber=7175 (Year: 1994).*

(Continued)

*Primary Examiner* — Benjamin Smith

(57) ABSTRACT

Methods and systems are provided for giving a name to an expression within a cell formula so that the said expression can be represented by the given name in all subsequent references within the cell formula in a spreadsheet application. In the edit mode, a user may enter any expression within a formula by its given name after defining it once anywhere in that formula. In the view mode, the cell formula may display all named expressions by their given names, with the definitions of the said names displayed as sub-formulas along with the computed value of the expressions. Features may be implemented as an add-in, a macro, a function, a direct modification of the spreadsheet application, or any combination thereof. Implementations may be used with electronic spreadsheet applications generally, including programs such as Microsoft Excel, Google Sheets, Lotus 123, but not limited to such.

20 Claims, 12 Drawing Sheets

(56) References Cited

U.S. PATENT DOCUMENTS

| | | | |
|---|---|---|---|
| 7,444,584 B1 | 10/2008 | Hobbs | |
| 7,539,974 B2* | 5/2009 | Beck | G06N 5/025 |
| | | | 717/136 |
| 7,895,511 B2* | 2/2011 | Aureglia | G06F 40/18 |
| | | | 715/770 |
| 8,161,372 B2* | 4/2012 | Ellis | G06F 40/18 |
| | | | 715/219 |
| 8,386,916 B2* | 2/2013 | Le Brazidec | G06Q 10/10 |
| | | | 715/219 |
| 8,499,290 B2* | 7/2013 | Messerly | G06F 40/18 |
| | | | 717/109 |
| 8,584,004 B2* | 11/2013 | Rae | G06Q 40/04 |
| | | | 715/219 |
| 8,819,079 B2* | 8/2014 | Bush | G06F 16/24575 |
| | | | 715/968 |
| 9,047,266 B2* | 6/2015 | Chavoustie | G06F 40/18 |
| 9,075,787 B2* | 7/2015 | Schodl | G06F 40/18 |
| 9,098,483 B2* | 8/2015 | Le Brazidec | G06F 16/283 |
| 9,697,193 B2* | 7/2017 | Lin | G06F 16/5846 |
| 9,875,227 B2* | 1/2018 | Bauchot | G06F 40/18 |
| 10,140,280 B2* | 11/2018 | Sobhy Deraz | G06F 40/18 |
| 10,437,428 B2* | 10/2019 | Callaghan | G06F 3/0484 |
| 10,509,858 B1 | 12/2019 | Smith Devine | G06F 8/20 |
| 10,515,145 B2* | 12/2019 | Canton | G06F 40/111 |
| 10,685,175 B2* | 6/2020 | Castañeda-Villagrán | G06F 40/186 |
| 10,699,068 B2* | 6/2020 | Gross | G06F 40/123 |
| 10,726,201 B1* | 7/2020 | Gross | G06F 8/311 |
| 10,789,414 B2* | 9/2020 | Schoedl | G06F 40/18 |
| 10,846,469 B2* | 11/2020 | Sobhy Deraz | G06F 9/543 |
| 10,853,732 B2* | 12/2020 | McDaid | G06N 7/01 |
| 10,891,434 B2* | 1/2021 | Peyton Jones | G06F 40/103 |
| 10,949,609 B2* | 3/2021 | Castañeda-VillagrAN | G06N 20/00 |
| 11,023,669 B2* | 6/2021 | Gross | G06F 40/20 |
| 11,423,116 B2* | 8/2022 | Gross | G06F 40/18 |
| 11,423,218 B2* | 8/2022 | Keslin | G06F 40/18 |
| 2004/0103366 A1* | 5/2004 | Peyton-Jones | G06F 40/18 |
| | | | 715/213 |
| 2005/0114494 A1* | 5/2005 | Beck | G06F 9/542 |
| | | | 709/224 |
| 2006/0080595 A1* | 4/2006 | Chavoustie | G06F 40/18 |
| | | | 715/213 |
| 2006/0224946 A1* | 10/2006 | Barrett | G06F 40/18 |
| | | | 715/209 |
| 2007/0136652 A1* | 6/2007 | Ellis | G06F 40/18 |
| | | | 715/209 |
| 2008/0256433 A1* | 10/2008 | Aureglia | G06F 40/18 |
| | | | 715/220 |
| 2009/0271693 A1* | 10/2009 | Rae | G06Q 40/04 |
| | | | 715/219 |
| 2010/0169759 A1* | 7/2010 | Le Brazidec | G06Q 10/10 |
| | | | 715/219 |
| 2011/0307874 A1* | 12/2011 | Messerly | G06F 40/18 |
| | | | 717/136 |
| 2016/0162461 A1* | 6/2016 | Simon | G06F 3/0484 |
| | | | 715/220 |
| 2017/0220543 A1* | 8/2017 | Canton | G06F 40/18 |
| 2017/0255608 A1* | 9/2017 | Migeon | G06F 40/18 |
| 2017/0337174 A1* | 11/2017 | Nault | G06F 40/166 |
| 2018/0005122 A1* | 1/2018 | McDaid | G06N 5/04 |
| 2018/0260373 A1* | 9/2018 | Sobhy Deraz | G06F 9/449 |
| 2018/0260374 A1* | 9/2018 | Sobhy Deraz | G06F 17/10 |
| 2018/0341371 A1* | 11/2018 | Callaghan | G06F 40/177 |
| 2019/0121847 A1* | 4/2019 | Castañeda-Villagrán | G06F 40/186 |
| 2019/0340219 A1* | 11/2019 | Schoedl | G06F 3/0481 |
| 2020/0004799 A1* | 1/2020 | Gross | G06F 17/11 |
| 2020/0004811 A1* | 1/2020 | Gross | G06F 17/17 |
| 2020/0004812 A1* | 1/2020 | Gross | G06F 40/18 |
| 2020/0167415 A1* | 5/2020 | Peyton Jones | G06F 40/103 |
| 2020/0257852 A1* | 8/2020 | Canton | G06F 40/151 |
| 2020/0265187 A1* | 8/2020 | Castañeda-Villagrán | G06F 40/186 |
| 2020/0285694 A1* | 9/2020 | Nield | G06F 9/45504 |
| 2021/0117615 A1* | 4/2021 | Castañeda-Villagrán | G06F 9/5077 |
| 2021/0256205 A1* | 8/2021 | Sarkar | G06F 3/04842 |
| 2022/0188505 A1* | 6/2022 | Keslin | G06F 40/103 |

OTHER PUBLICATIONS

Chris Newman at TheSpreadsheetGuru "All About Excel's New LET Function", 2020, 10 pages; https://www.thespreadsheetguru.com/blog/excel-let-function (Year: 2020).*

Svetlana Cheusheva, "Why use dollar sign ($) in Excel formulas—absolute and relative cell references", Jul. 9, 2017, 17 pages, https://web.archive.org/web/20170709074608/https://www.ablebits.com/office-addins-blog/2015/11/25/relative-absolute-reference-excel/ (Year: 2017).*

Mathworks, "MATLAB Functions in Microsoft Excel", https://www.mathworks.com/help/exlink/matlab-commands-in-microsoft-excel.html, archived in the Wayback Machine on Dec. 22, 2016, 5 pages (Year: 2016).*

Mathworks, "inline", https://www.mathworks.com/help/matlab/ref/inline.html, archived in the Wayback Machine on Jul. 20, 2016, 3 pages (Year: 2016).*

* cited by examiner

Flow Chart
(Formula Edit Mode)

Example – 1
(Simple Definitions)

View Modes
(Simple Definitions)

Flow Chart
(Copy Function)

Figure 7
Copying Formula
(Simple Definitions)

Example Spreadsheet B — 700

| | A | B | C | D | E | F | G | H | I | J |
|---|---|---|---|---|---|---|---|---|---|---|
| 1 | 0.25 | 0.17 | | | | | 30 | 10 | 40 | |
| 2 | | | | | | | 25 | 20 | 35 | |
| 3 | | | | | | | 20 | 30 | 30 | |

705 — Cell A1: Formula with current conventions (view and edit mode)
=IF( (G1-G2)/G3 > (H1-H2)/H3 , (G1-G2)/G3 , (H1-H2)/H3 )

710 — Cell A1: Formula with present invention (edit mode)
=IF( ((G1-G2)/G3)__X > ((H1-H2)/H3)__Y , X , Y )

715 — Cell A1: Formula with present invention (view mode)
=IF( ((G1-G2)/G3)$_x$ > ((H1-H2)/H3)$_y$ , x, y)

720 — Cell A1: Formula with present invention (enhanced view mode)
=IF( x > y , x, y )

706 — Cell B1: Copied Formula with current conventions (view and edit mode)
=IF( (H1-H2)/H3 > (I1-I2)/I3 , (H1-H2)/H3 , (I1-I2)/I3)

711 — Cell B1: Copied Formula with present invention (edit mode)
=IF( ((H1-H2)/H3)__X > ((I1-I2)/I3)__Y , X , Y )

716 — Cell B1: Copied Formula with present invention (view mode)
=IF( ((H1-H2)/H3)$_x$ > ((I1-I2)/I3)$_y$ , x, y)

721 — Cell B1: Copied Formula with present invention (enhanced view mode)
=IF( x > y , x, y )

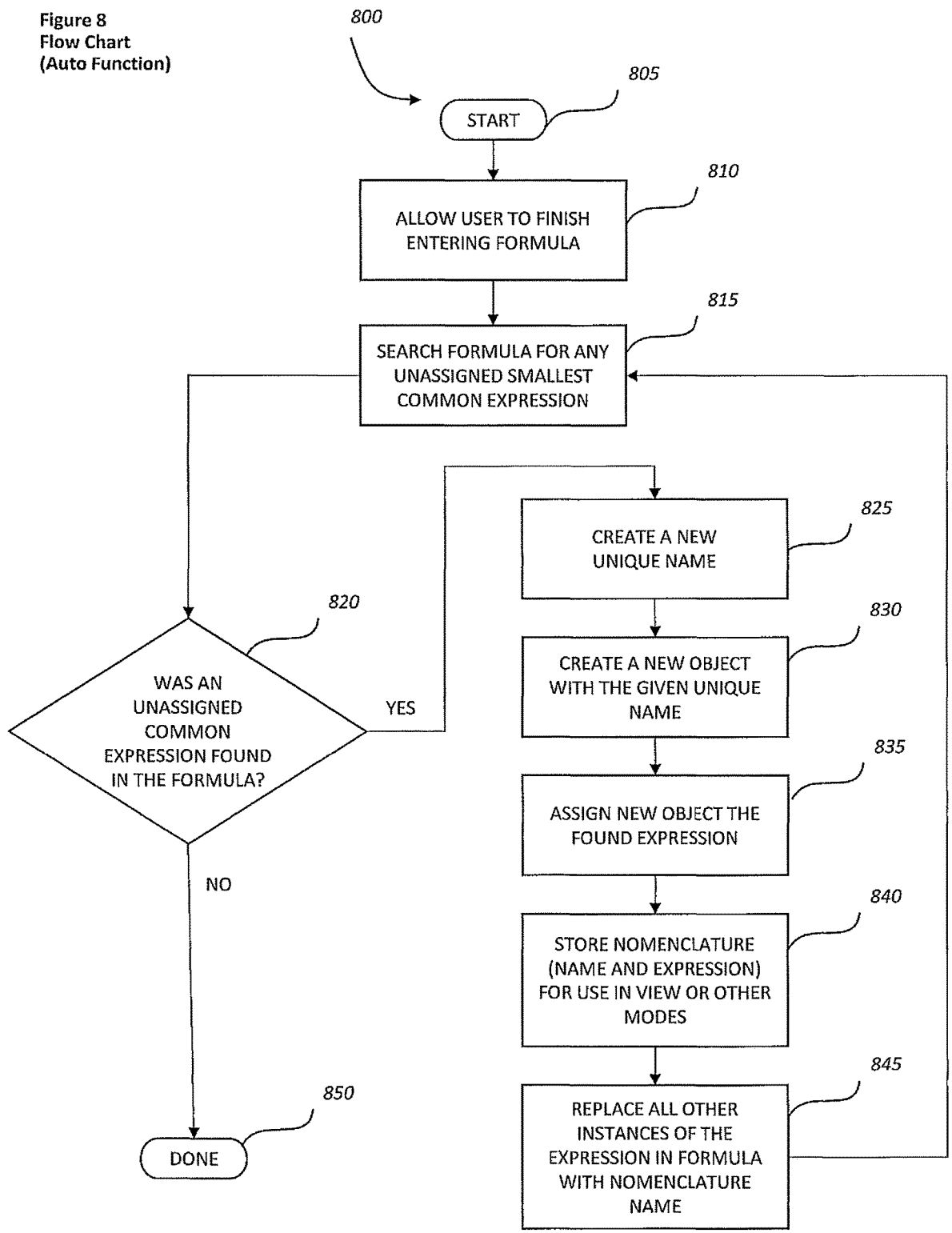

Example — 1
(Auto Nomenclature)

Figure 10
Basic Idea – 2
(Nested Definitions)

Example Spreadsheet B

|   | A | B | C | D | E | F | G | H | I | J |
|---|---|---|---|---|---|---|---|---|---|---|
| 1 | 0.58 |   |   |   |   |   | 30 | 10 |   |   |
| 2 |   |   |   |   |   |   | 25 | 20 |   |   |
| 3 |   |   |   |   |   |   | 20 | 30 |   |   |

Cell A1: Formula with current conventions (edit and view mode)

=IF( (G1-G2)/G3 - (H1-H2)/H3 > 0, (G1-G2)/G3 - (H1-H2)/H3 , (G1-G2)/G3 + (H1-H2)/H3)

Cell A1: Formula with present invention (edit mode)

=IF(( ((G1-G2)/G3)_X − ((H1-H2)/H3)_Y)_Z > 0, Z, X + Y )

Cell A1: Formula with present invention (view mode)

=IF(( ( (G1-G2)/G3)$_x$ − ((H1-H2)/H3) )$_z$ > 0, z, x+y)

Enhanced Viewer – 2
(Nested Definitions)

Operand with Cell Reference Syntax

METHOD AND SYSTEM FOR DYNAMIC NAMING OF COMPONENT EXPRESSIONS WITHIN A FORMULA IN A CELL IN A SPREADSHEET APPLICATION

CROSS-REFERENCES TO RELATED APPLICATIONS

This application claims priority to and benefit of U.S. Provisional Patent Application No. 62/745,760, filed Oct. 15, 2018, entitled "Method and System for Dynamic Naming of Component Expressions Within a Formula in a Cell in a Spreadsheet Application," and which is hereby incorporated by reference in its entirety.

A portion of the disclosure of this patent document contains material that is subject to copyright. The copyright owner has no objection to the authorized facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to a METHOD AND SYSTEM FOR DYNAMIC NAMING OF COMPONENT EXPRESSIONS WITHIN A FORMULA IN A CELL IN A SPREADSHEET APPLICATION. Specifically, the present disclosure relates to apparatuses, systems, and methods for providing dynamic naming of component expressions within a formula in a cell in a spreadsheet application.

Consultants and analysts are often involved in developing complicated spreadsheet models for their clients. These models involve complex logic, incorporating many cell inputs and embedded functions. Spreadsheet models are often shared amongst different users, many of whom are less skilled in the use of spreadsheet tools. Hence, there is a need to design spreadsheet logic in such a manner as to be understandable by users with varying skill levels. When the logic becomes complex, formulas can become so long that the entire formula may not fit in a single formula bar making it difficult for the spreadsheet developer and user to see and understand the full logic easily. This makes the development task of the analyst prone to errors.

Analysts may simplify the logic by breaking up a formula into several intermediate calculations in a series of distinct cells. However, such steps make the entire model bulkier and more difficult to digest as the user must track and understand the interrelationship of all these distinct cells. Alternatively, the analyst can keep the number of cells to a minimum by writing longer formulas, but the proofing of the logic can be onerous, leading to quality control issues.

Another way spreadsheet developers try to make their formulas easier to understand is by creating and naming cells containing a component of the formula or expression. However, this does not solve the model bulk and spread problem described above and requires the developer to name many individual cells. This creates additional work around managing cell names and the ranges they correspond to increasing complexity in a whole new way. Further, the names assigned to the cells are global, whereby, they refer to the same cell regardless of where in the spreadsheet or workbook they are used. When these formulas are copied to new rows or columns, the names act as fixed references to the cell rather than moving relationally to other cells as may be the more appropriate functionality desired in model development.

Accordingly, there is a need in the art for a method and system for naming expressions within a cell formula in simplified manner within the formula itself so that the name can be immediately used in other parts of that formula where that same expression is used again and in place of it. There is further a need for such a given name to refer to the assigned expression in a relational manner when such a formula is copied to cells in other rows or columns in the spreadsheet. The name of the expression need not be not globally fixed in the spreadsheet and instead can have meaning only in the context of the cell that it resides in. Thus, the same name can refer to different expressions in different cells and can be copied to different rows and cells with corresponding relational assignment of expressions. Finally, there is a need to display the formula and named expressions within it in a manner that is easy for the developer and the user to see and understand.

BRIEF SUMMARY OF THE INVENTION

Implementations consistent with the present disclosure may solve problems associated with traditional devices by providing apparatuses, systems, and methods for naming component expressions within a formula in a cell in a spreadsheet application.

The present disclosure generally relates to spreadsheet application systems used commonly in desktop computers or mobile devices, which may be available as device resident applications, on enterprise servers or on cloud servers as software as a service (SAAS), but not limited to them. More particularly, the present disclosure relates to modifying cell formulas in a spreadsheet application to simplify the logic, improve readability and reduce errors.

Embodiments of the present invention solve the aforementioned and other problems by providing a method and system for formulaically modifying operations within a cell formula in a spreadsheet application. Generally described, aspects of embodiments of the present disclosure allow a spreadsheet application to name an expression within a cell formula simply so that the name can be used in other parts of the same formula in place of the expression and copied to other cells in a relational manner.

More specifically described, in a spreadsheet application, a novel method for naming expressions within a formula are provided as well as rules for changing expression assignments automatically when the formula is copied. A unique operand symbol when written in a formula signals to the formula processor that a delineated expression within the formula is associated with a given name. Multiple names within the same formula are possible and the named expressions can be nested within other named expressions. An enhanced formula view mode is provided, in which, the user can see the formula as entered, along with a list of all the name definitions in the form of sub-formulas. When such a formula is copied to other cells, the name itself is unaltered, but the expression assigned to the name is altered relationally as per the norm prevailing in the spreadsheet application on what happens to any expression when it is copied from one cell to another.

In operation, at spreadsheet application set-time, when a formula is set into a spreadsheet cell, the set formula is obtained for inspection by the spreadsheet application. The formula is inspected for modification as per the rules described above and processed accordingly.

These and other features and advantages, which characterize the present disclosure, will be obvious from a study of the detailed description and drawing provided in the following sections and attachments. It is noted that that the descriptions and drawings provided in the various sections of this document are exemplary and explanatory only and are not restrictive of the description herein.

The terms worksheet and spreadsheet are used interchangeably throughout the description.

Numerous other objects, features, and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

FIG. 7 is a partial spreadsheet diagram reflecting an example of how a formula using such nomenclature syntax looks and processes in the view and edit modes when copied from one cell to another, according to aspects of the present disclosure.

FIG. 8 is flowchart illustrating an exemplary embodiment of a routine for automatically applying and creating a formula that utilizes the nomenclature syntax defined according to aspects of the present disclosure to formulae entered without such nomenclature by the user.

FIG. 10 is a partial spreadsheet diagram illustrating a simple example of the dynamic naming logic applied to expressions within an "IF" formula in the Microsoft Excel syntax using three given names, where nested nomenclature syntax is used.

DETAILED DESCRIPTION

Figure 1:
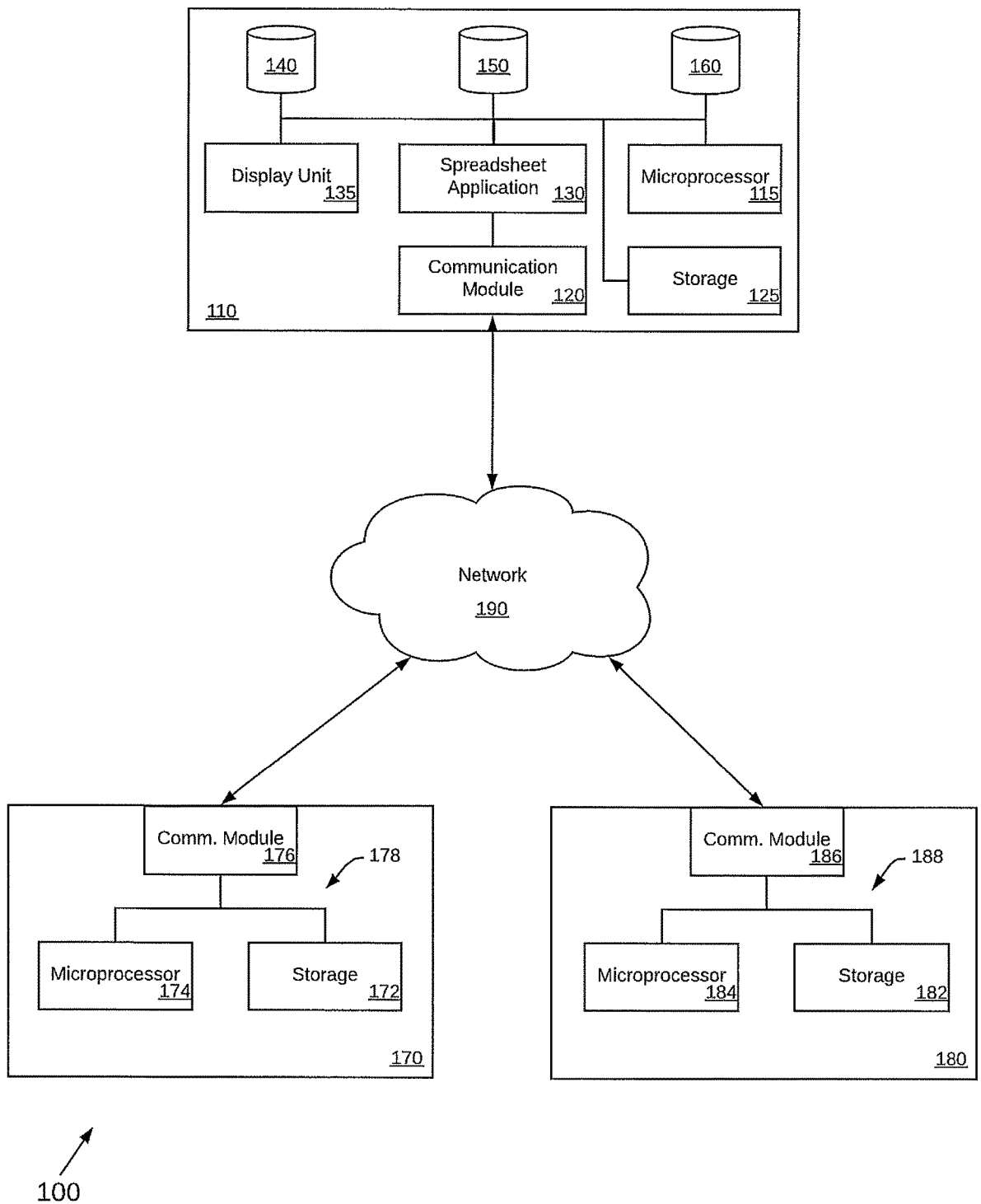
FIG. 1 is a partial block diagram of a device and network configuration for an exemplary embodiment according to aspects of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use aspects of the present disclosure and do not delimit the scope of the invention.

FIGS. 1-12 illustrate various exemplary apparatuses and associated methods according to the present disclosure that are described below. Where the various figures may describe embodiments sharing various common elements and features with other embodiments, similar elements and features are given the same reference numerals and redundant description thereof may be omitted below.

Various embodiments of an apparatus according to the present disclosure may provide apparatuses, systems, and methods for naming component expressions within a formula in a cell in a spreadsheet application.

FIG. 1 illustrates a block diagram of a spreadsheet processing system 100 in accordance with an exemplary embodiment. The spreadsheet processing system 100 includes at least one of a computing device 110, a server 170, and a remote device 180. Each of the computing device 110, the server 170, and the remote device 180 may be connected to a network 190. In one exemplary embodiment, the network 190 includes the Internet, a public network, a private network, or any other communications medium capable of conveying electronic communications. Connection between a communication module 120 of the computing device 110 and the network 190 is configured to be performed by wired interface, wireless interface, or a combination thereof, without departing from the spirit and the scope of the present disclosure. In one exemplary operation, the computing device 110 is configured to store one or more sets of instructions in a storage 125. The one or more sets of instructions may be configured to be executed by a microprocessor 115 of the computing device 110 to perform operations corresponding to the one or more sets of instructions.

In various exemplary embodiments, the computing device 110 is implemented as at least one of a desktop computer, a laptop computer, a smart phone, or any other electronic device capable of executing instructions. The microprocessor 115 is configured to take the form of a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result.

The computing device 110 is configured in various embodiments to be associated with a mobile user, and is capable of being transported, either during operation or while powered off. In one embodiment where the computing device 110 is a cellular telephone or smartphone, the computing device 110 is at least temporarily located at a client's premises. In various embodiments, the computing device 110 is configured to operate remotely, and is configured to obtain or otherwise operate upon one or more instructions stored physically remote from the computing device 110 (e.g., via client-server communications and/or cloud-based computing).

The computing device 110 includes at least one of a spreadsheet database 140, a content database 150, and/or a metadata database 160. Although described with reference to spreadsheets, cells, and metadata, it should be appreciated that one or more of the databases 140, 150, and 160 may include any type of information or metadata relating to any set of data. For example, in one exemplary embodiment, each database may include at least a portion of spreadsheet data, content corresponding to one or more spreadsheets, and/or metadata associated with at least one of spreadsheet data or content corresponding to one or more spreadsheets, or any other set of data or metadata associated with the computing device 110. Furthermore, although described with reference to three separate databases, it should be appreciated that two or more of the enumerated databases may be physically and/or logically stored in a single database. Still further, one or more of the databases 140, 150, and/or 160 may be implemented in whole or in part by a distributed or cloud-based storage, either local to the computing device 110 or at least partially remote from the computing device 110, without departing from the spirit and the scope of the present disclosure.

The computing device 110 may include a display unit 135. The display unit 135 is embodied within the computing device 110 in one embodiment, and is configured to be either wired to or wirelessly-interfaced with the end user electronic device 200. The display unit 135 may be configured to operate, at least in part, based upon one or more operations of the Spreadsheet application 130, as executed by the microprocessor 115. Although operable using the display unit 135 of computing device 110, the Spreadsheet application 130 may be capable of executing and operating using a plurality of devices. For example, one or more computing devices 110 may include desktop computers, smart phones, tablets, laptop computers, etc., each having different microprocessors 115, screen resolutions, memory sizes, etc., but each may be capable of executing the Spreadsheet application 130 after download and/or installation of at least a portion of the Spreadsheet application 130 (e.g., from the server 170).

The server 170 is configured in a distributed configuration to perform one or more operations corresponding to the spreadsheet application 130. Although illustrated as a single server, the server 170 may be implemented as a plurality of servers or server elements, any of which may be located either within a single computing element or a plurality of computing elements. In one exemplary embodiment, the server 170 is configured to store at least a portion of an executable file, a portion of computer code, or other information associated with the Spreadsheet application 130, such that at least a portion of data corresponding to the Spreadsheet application 130 is transmitted from the server 170 to the computing device 110 via the network 190. For example, the server 170 may perform one or more functions corresponding to an application store configured to provide an executable copy of the Spreadsheet application 130 to the computing device 110, either automatically or in response to a download request.

The server 170 may, in one exemplary embodiment, include a storage 172 configured to store at least a portion of data corresponding to the Spreadsheet application 130. In one embodiment, the at least a portion of data corresponding to the Spreadsheet application 130 may include an executable or installable file for use by the computing device 110. Additionally or alternatively, the at least one portion of data may contain or embody a link or other association with at least one file located remotely from the server 170. A microprocessor 174 of the server 170 is configured to execute one or more set of instructions in a manner similar to that described above with relation to microprocessor 115. The server 170 may further include a communication module 176. The communication module 176 may be configured to communicate via the network 190, for example using at least one of a wired and/or wireless communication path. One or more of the storage 172, the microprocessor 174, and the communication module 176 may be coupled via a bus 178. The bus 178 may be a conductive path in one exemplary embodiment, however any means of conveying at least a portion of a signal between two or more of the storage 172, the microprocessor 174, and/or the communications module 176 may be used as the bus 178 without departing from the spirit and the scope of the present disclosure.

The spreadsheet processing system 100 may further include at least one remote device 180. The remote device 180 may be configured to transmit and/or receive data corresponding to at least one of the computing device 110 and/or the Spreadsheet application 130 in various embodiments. The remote device 180 may include a storage 182, configured to store at least one of computer instructions and/or data or metadata associated with the Spreadsheet application 130 and/or computing device 110. A microprocessor 184 of the remote device 180 is configured to execute one or more set of instructions in a manner similar to that described above with relation to microprocessor 115. The remote device 180 may further include a communication module 186. The communication module 186 may be configured to communicate via the network 190, for example using at least one of a wired and/or wireless communication path. One or more of the storage 182, the microprocessor 184, and the communication module 186 may be coupled via a bus 188. The bus 188 may be a conductive path in one exemplary embodiment, however any means of conveying at least a portion of a signal between two or more of the storage 182, the microprocessor 184, and/or the communications module 186 may be used as the bus 188 without departing from the spirit and the scope of the present disclosure.

Figure 2A:
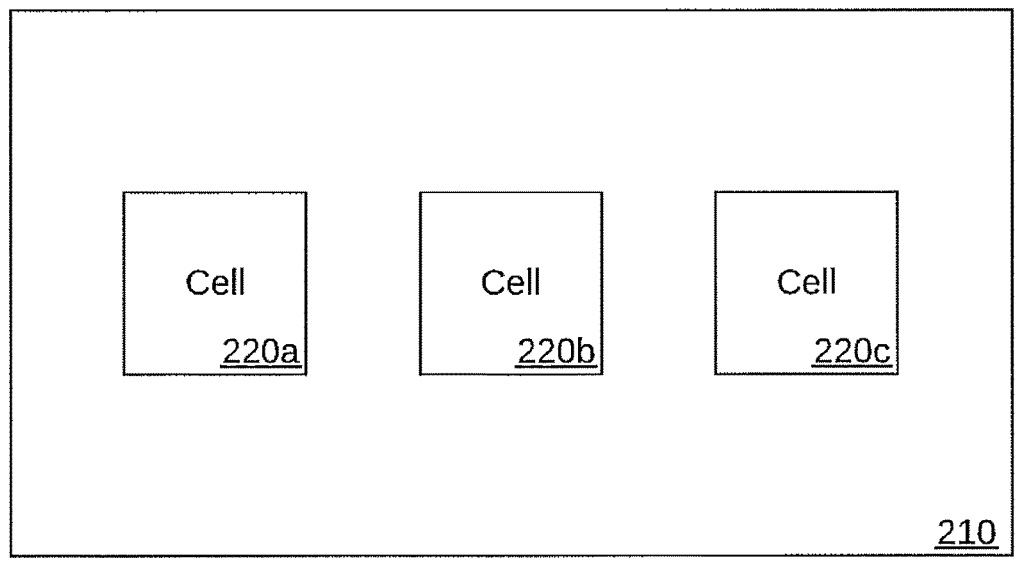
FIG. 2A is a simplified block diagram illustrating an exemplary spreadsheet application worksheet according to aspects of the present disclosure.

FIG. 2A is a simplified block diagram illustrating an exemplary spreadsheet application worksheet according to aspects of the present disclosure. The spreadsheet application 200 illustrated in FIG. 2A includes a spreadsheet worksheet 210. A plurality of spreadsheet cells are illustrated including cells 220a, 200b, and 200c. Although illustrated with three cells, it should be appreciated that a worksheet 210 may include any number of cells without departing from the spirit and scope of the present disclosure. In one exemplary embodiment, the spreadsheet application 200 is a spreadsheet application 130 for entering, calculating, manipulating, and displaying data of various forms. A user may enter data into each of the cells 220*a*, 220*b*, 220*c*, and at least one of the user and/or the spreadsheet application 130 may calculate, manipulate, and display such data. The user may utilize the spreadsheet application 200 to compute data and generate visually perceptible information associated with spreadsheet content data. According to embodiments of the present disclosure, and as described in detail below, the content of one cell 220 of the spreadsheet application 200 may be linked to other cells in the spreadsheet application 200 so that changes made to data in one cell may be reflected in other linked cells.

Figure 2B:
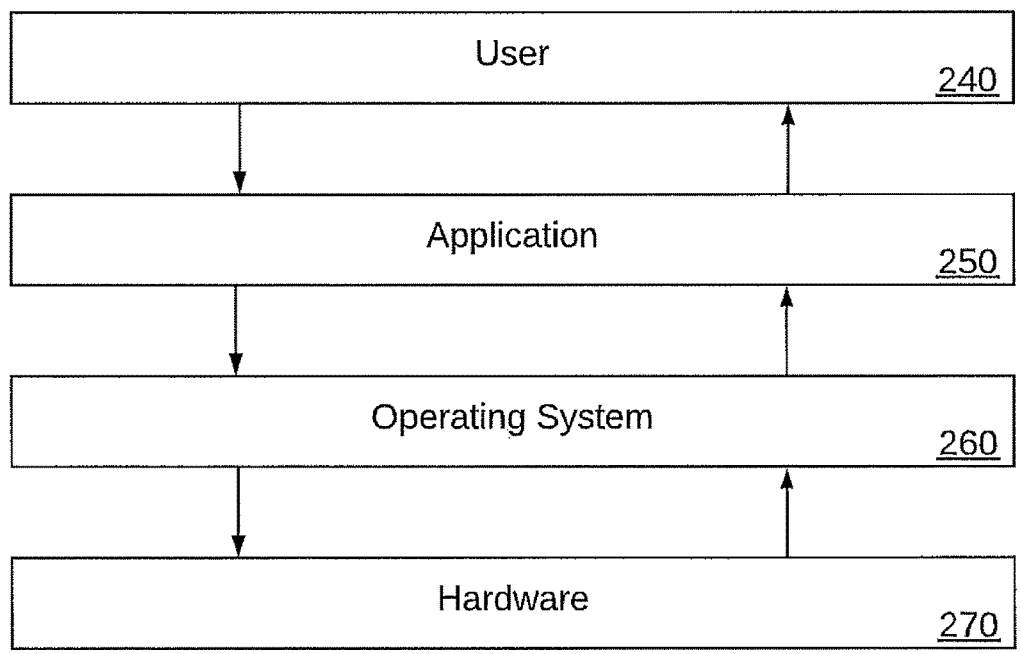
FIG. 2B is a high-level processing model associated with computing systems like those described herein, according to aspects of the present disclosure.

FIG. 2B is a high-level processing model associated with computing systems like those described herein, according to aspects of the present disclosure. The processing model 230 includes a User layer 240. A user at the user layer 240 may interact with a software program at the application layer 250 to send and/or receive at least one set of information. The application layer 250 may include, for example, spreadsheet application 130 and/or any other software executable by a computing device 110. The user may interface with the application layer 250 to cause one or more actions to be performed by a computing device optionally using at least one operation performed at an operating system layer 260. The operating system layer 260 is capable of causing one or more functions to be performed by at least one of the application layer 250 and/or a hardware layer 270. The hardware layer 270 may include at least one component of a computing device 110, as described above with reference to FIG. 1.

In operation, a user may input a command at the user layer 240, which is communicated to the application layer 250 using one or more wired or wireless communication links. The application layer 250 is configured to perform one or more operations corresponding to information sent to or received from the user layer 240, such as translating a user request into a command issued to the operating system layer 260. The operating system layer 260 is configured to enable executing of the application layer 250 and to control operations across the hardware/software division between the application layer 250 and the hardware layer 270. The operating system layer 260 may translate between software/hardware command structures, and may optionally act as a gatekeeper to limit access or control across the hardware/software gap. The hardware layer 270 is configured to perform one or more hardware operations of the computing device 110. Each of the user layer 240, the application layer 250, the operating system layer 260, and/or the hardware layer 270 are coupled to one or more adjacent layers via one or more wired or wireless communication paths, and each layer may be configured to perform at least one of sending information, receiving information, and/or both sending and receiving information between itself and another layer.

Figure 3:
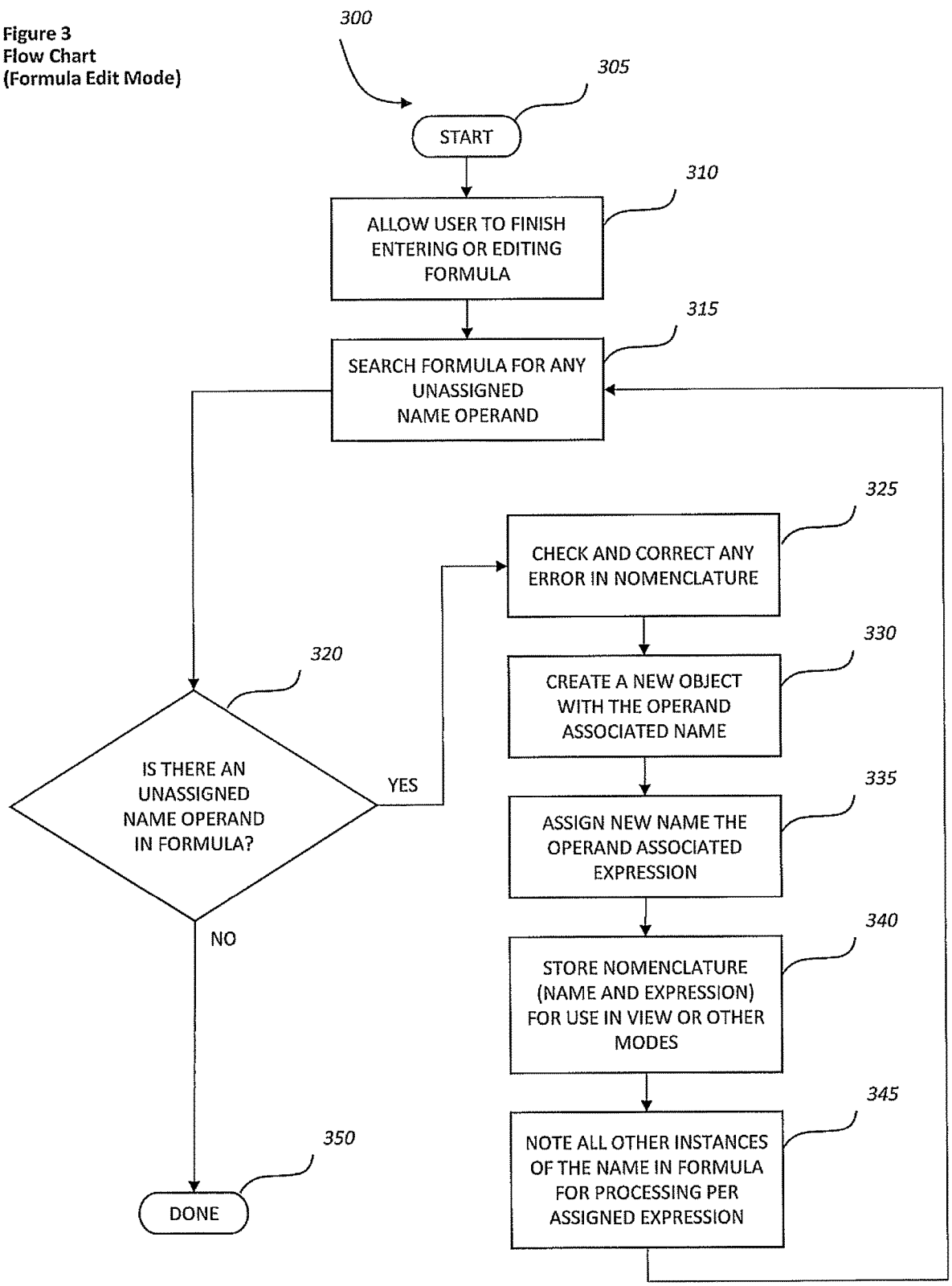
FIG. 3 is a flowchart illustrating an exemplary embodiment of a routine for naming expressions within a formula in the formula edit mode according to aspects of the present disclosure.

The present disclosure permits interacting with spreadsheet applications located natively on the computer or mobile device (e.g., computing device 110) of the user or virtually on cloud servers. The elements of the capability described herein include the definition of an operand that would allow for the creation and use of multiple nomenclature objects in the expressions contained within a cell formula, and a formula viewer which would allow the user to see any cell formula with its nomenclature assigned names and expressions, the result of solving those expressions and the simplified view of the resulting full-cell formula. Various exemplary embodiments described herein provide for the use of this capability as an add-on to a spreadsheet application, a macro, a function or modification to the software driving the spreadsheet application, but not limited to the same. This capability will be called by the use of the defined operand for in-cell naming and used for the execution of other functions within that cell and for defined view modes. FIG. 3 describes the process by which the electronic spreadsheet application is capable of identifying when this set of functions and tools is being called.

Figure 4:
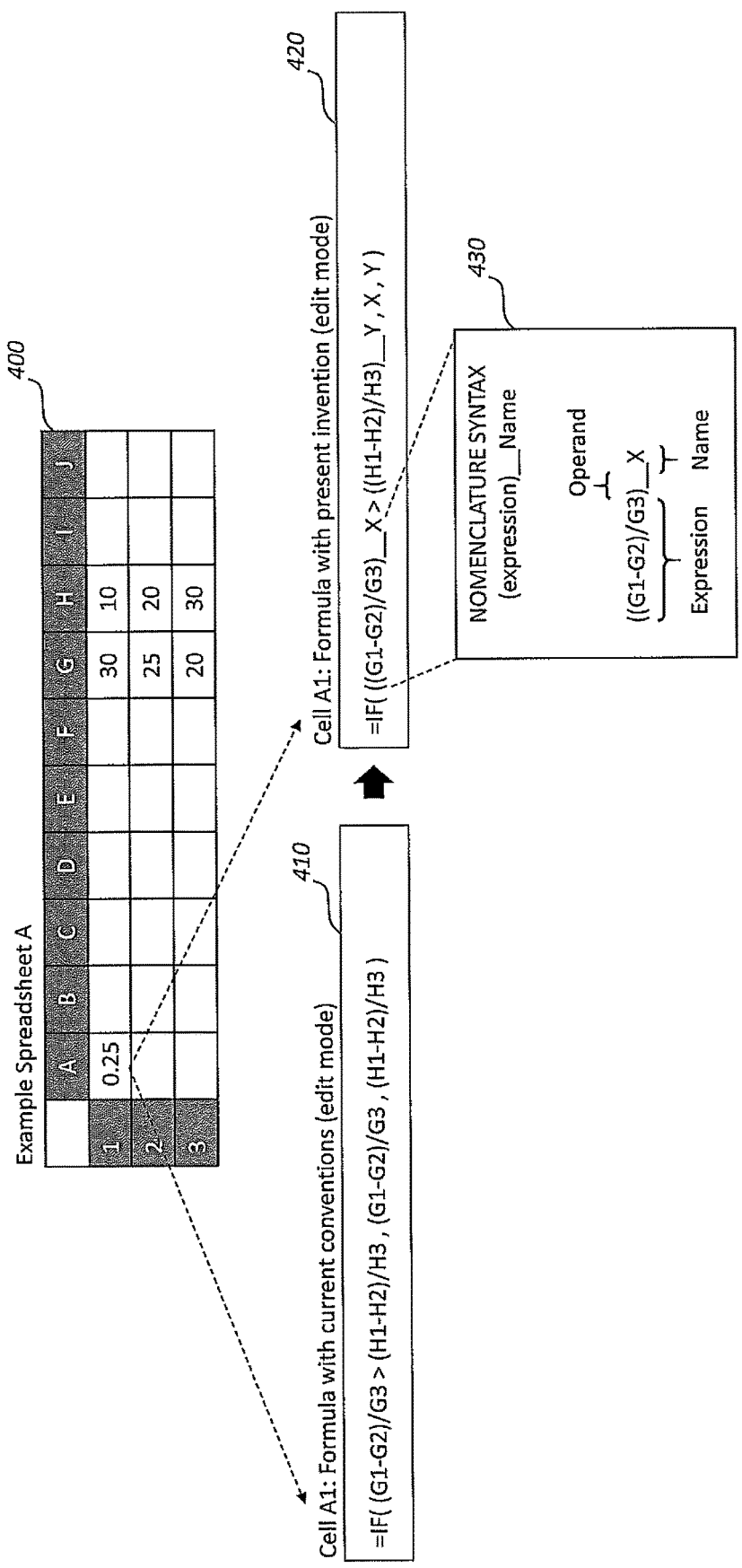
FIG. 4 is a partial spreadsheet diagram reflecting a simple example of the dynamic naming logic applied to expressions within an "IF" formula in the Microsoft Excel syntax using two given names.
Figure 5:
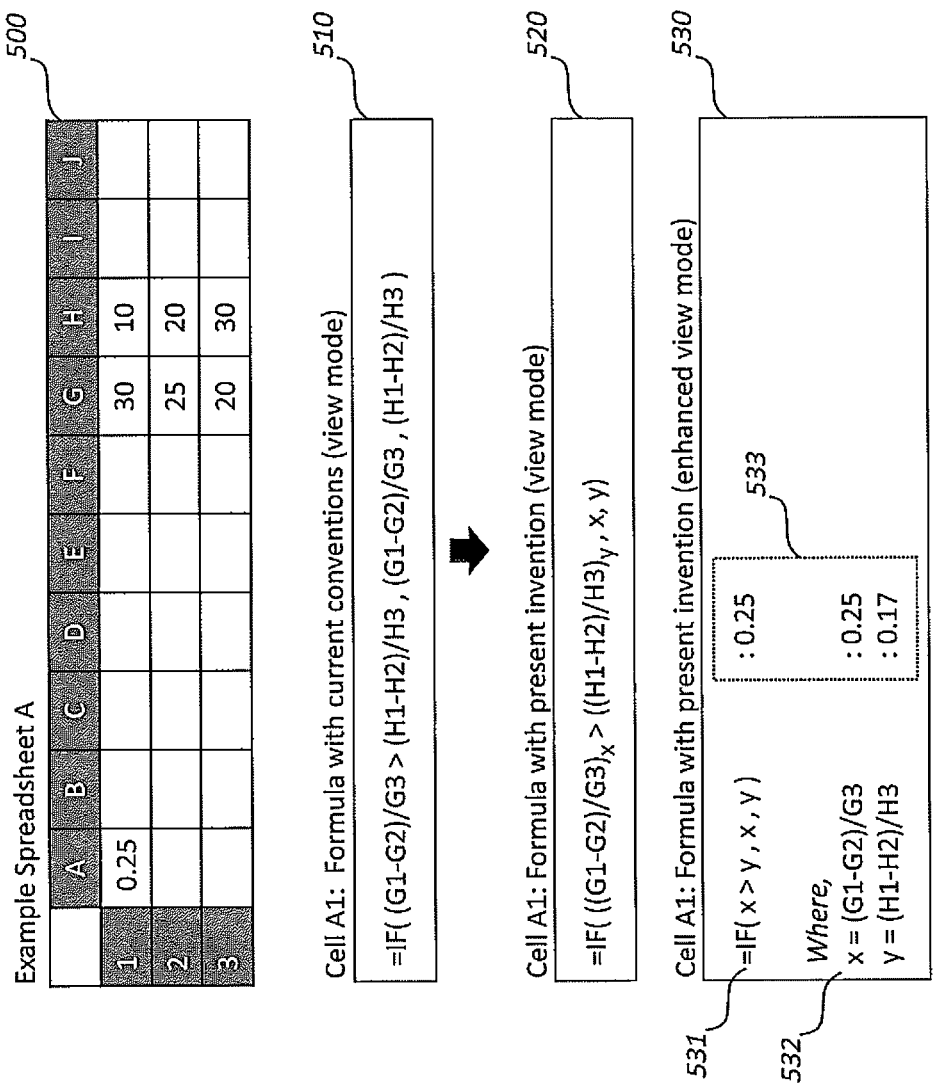
FIG. 5 illustrates an example of how a formula using such nomenclature syntax may look in the view mode and an enhanced view mode.

FIG. 4 and FIG. 5, illustrate how a spreadsheet user may write or edit a cell formula, and view it in a standard or enhanced mode. FIG. 3 is a flow chart showing an illustrative routine for modifying formula operations within a spreadsheet application using dynamic naming. FIG. 4 is an example of a spreadsheet and an illustration of how a nomenclature object works. The nomenclature object follows a defined syntax that clearly specifies the expression and its given name. FIG. 4 shows an example of such a syntax in box 430. There are three parts to the syntax, namely, the name, the operand and the expression. For example, the nomenclature operand can be two sequential double underscore symbols, namely, "__" or any other symbol or combination thereof that has not been reserved by the spreadsheet application for other operands. Given its uniqueness, the operand can be thus recognized by the spreadsheet application as a trigger for recognizing and processing the nomenclature object. The syntax for the nomenclature object can be the expression, with open and close brackets serving optionally as delimiters that delineate the beginning and the end of the expression, followed by the operand, followed by the name itself. Thus, as an example, the nomenclature may be represented as "(expression)_name". In the example in FIG. 4, we see this in practice, where the spreadsheet application creates two nomenclature objects, with names 'X' and 'Y', which are assigned the expressions ((G1−G2)/G3) and ((H1−H2)/H3) respectively, as per the syntax shown in 430. FIG. 4 shows the syntax for the naming system in accordance with the present disclosure, referred to as "nomenclature syntax."

These assignments create the formula relationships X=((G1−G2)/G3) and Y=((H1−H2)/H3). If the expression is not delimited by brackets, the expression will be assigned by default rules set by the spreadsheet application. In this example and as an illustration of a possible default logic, without the brackets, the spreadsheet application could create the nomenclature objects 'X' and 'Y' with the relationships X=G3 and Y=H3 respectively. The system of relationships thus described constitute the nomenclature object or nomenclature and is referred to as such in the following text. The nomenclature object can be considered to have the following properties, a name, an expression, and a relationship equating the name with the expression. As will be described later, in one exemplary embodiment, the nomenclature object only has relevance and scope in the context of the cell formula that it is entered in. Some other variations of the nomenclature syntax can provide additional powerful functionalities and are also described later.

The routine 300 begins at start block 305 where the user desires to manipulate a cell formula in the spreadsheet. At block 310, the user completes entering or editing a formula in a spreadsheet cell. Once the spreadsheet application detects that the user has finished entering or editing the formula, it advances to block 315, where it searches the user entry for the name operand which would signal the existence of a naming system or nomenclature object within the formula. Reference is made to objects in the preceding paragraph for explanatory purposes and is not intended to limit the disclosure to object based programing language. Implementations consistent with the present disclosure may be executed with a variety of programming languages.

At block 320, the spreadsheet application 130 checks if a name operand was entered by the user. If none was, the program advances to block 350 and no further special action is taken. If the name operand is present in the formula, the spreadsheet application 130 evaluates it for proper syntax and other errors in block 325. If errors are found, they are optionally processed as per predefined rules to help the user enter the formula correctly. Once no errors are found, the spreadsheet application is deemed to have found a valid nomenclature. At block 330, a new nomenclature object, called by the name associated with the found name operand, is created and at block 335, assigned the expression associated with the found name operand. At block 340, the assigned nomenclature object is stored for use in accompanying view modes and other processes. Next, at block 345, all other instances of the nomenclature name in the formula are noted by the spreadsheet application 130 for processing as per the assigned expression. As can be seen in the example in FIG. 4, the name, 'X', would be assigned the formula ((G1−G2)/G3) and computed as such in the IF function in all instances where it appears without a definitional syntax. The process, from block 315 to 345 is repeated in a program loop to identify additional name operands with valid nomenclature objects until all nomenclatures have been identified and stored with their designated properties. In our example, the spreadsheet application would further find the name "Y", and assign it with its designated expression ((H1−H2)/H3). If no further name operands exist, the routine would exit at block 350. The computation of the cell contents would proceed as it normally does in the spreadsheet application, taking into account the nomenclature objects as described above, only after the routine is complete at block 350.

FIG. 4 is a partial spreadsheet diagram reflecting a simple example of the dynamic naming logic applied to expressions within an "IF" formula in the Microsoft Excel syntax using two given names. A cell formula edit mode describes the instance when a user is entering or editing a desired formula in a formula cell, as for example, in a designated formula bar 410. In FIG. 4, an example spreadsheet is shown in 400, with data in cells G1 to G3 and H1 to H3. Cell A1, contains a formula with the computational logic shown in formula box 410. Under currently prevalent conventions, this formula may be entered as =IF((G1−G2)/G3>(H1−H2)/H3, (G1−G2)/G3, (H1−H2)/H13). However, for implementations consistent with the present disclosure, the user could enter the formula more simply as =IF(((G1−G2)/G3)_X>((H1−H2)/H3)_Y, X, Y) as shown in formula bar 420. Thus, by tagging relevant expressions with the nomenclature, the user is able to avoid the need for re-entering those expressions. Those familiar in the art will note that in either case the user would need to enter the expression (G1−G2)/G3. However, by entering it as ((G1−G2)/G3)_X, the user automatically creates a nomenclature with the relationship X=((G1−G2)/G3), which then in subsequent instances can simply be written as X. The resulting formula is shorter and its computational logic is easier for the user to follow. In longer formulas, with more complex computational logic, the benefits of implementations consistent with the present disclosure increase substantially.

In FIG. 5, another aspect of the present disclosure involving the format of the cell formula and information available to the user in the viewing modes is discussed. For illustrative purposes, the example spreadsheet illustrated by FIG. 5 may be the same as that of FIG. 4. A cell formula view mode describes the instance when a user inspects the formula that was previously completely entered, without attempting to edit it, as for example, in a designated formula bar. FIG. 5 shows three different viewing modes and the key aspects of each under current conventions and the disclosure for comparative purposes. The view modes described here correspond to the example shown in FIG. 4. In both FIG. 4 and FIG. 5 the same spreadsheet, referred to as 400 and 500 respectively, is shown. Under current conventions, the formula entered in spreadsheet cell A1 could be depicted in block 510 as =IF((G1−G2)/G3>(H1−H2)/H13, (G1−G2)/G3, (H1−H2)/H13). According to the present disclosure, the nomenclature operand, as entered, will be replaced by a short-hand denoted by (expression)NAME 520. Thus, the formula in our example could be shown as =IF(((G1−G2)/G3)x>((H1−H2)/H3)y, x, y) as shown in box 520. In this case, the name operand is eliminated and the name is shown as a subscript to assigned expression, which is delineated or delimited by a set of open and closed brackets. This is done for the ease of viewing the formula and its nomenclature relationships. In the edit mode, shown in the same example in FIG. 4, the formula would be visible as =IF(((G1−G2)/G3)_X>((H1−H2)/H3)_Y, X, Y) for ease in editing.

An enhanced view mode is illustrated in block 530. When triggered, the enhanced view mode provides even greater ease in viewing the formula and its nomenclature relationships. In this mode, the identified nomenclatures are shown simply as their name, so that the formula in our example is viewable as =IF(x>y, x, y) as depicted in block 531. The relationship defined by each nomenclature are listed separately. In our example, this is depicted in block 532, where in the enhanced view mode we also show that x=(G1−G2)/G3 and y=(H1−H2)/H3. In addition, we show the actual computed values of each nomenclature and the overall formula alongside their definitions as depicted in 533 in the formula box. Thus, for one or more implementations consistent with the present disclosure, the user can have considerable ease in viewing their formulas in a manner that improves interpretation and understanding of the logic. The enhanced view mode could be triggered in a number of ways, including, but not limed to, with a special button, right click of the mouse button, click of the mouse in conjunction with another pressed key or delayed hovering of the pointer.

It may be noted that in many conventional embodiments of spreadsheet applications, the formula appears the same way in both view and edit mode. In exemplary embodiments of the present disclosure, the formula appearance can be very different in the edit and view modes as is obvious from the illustrations in FIG. 5.

Figure 6:
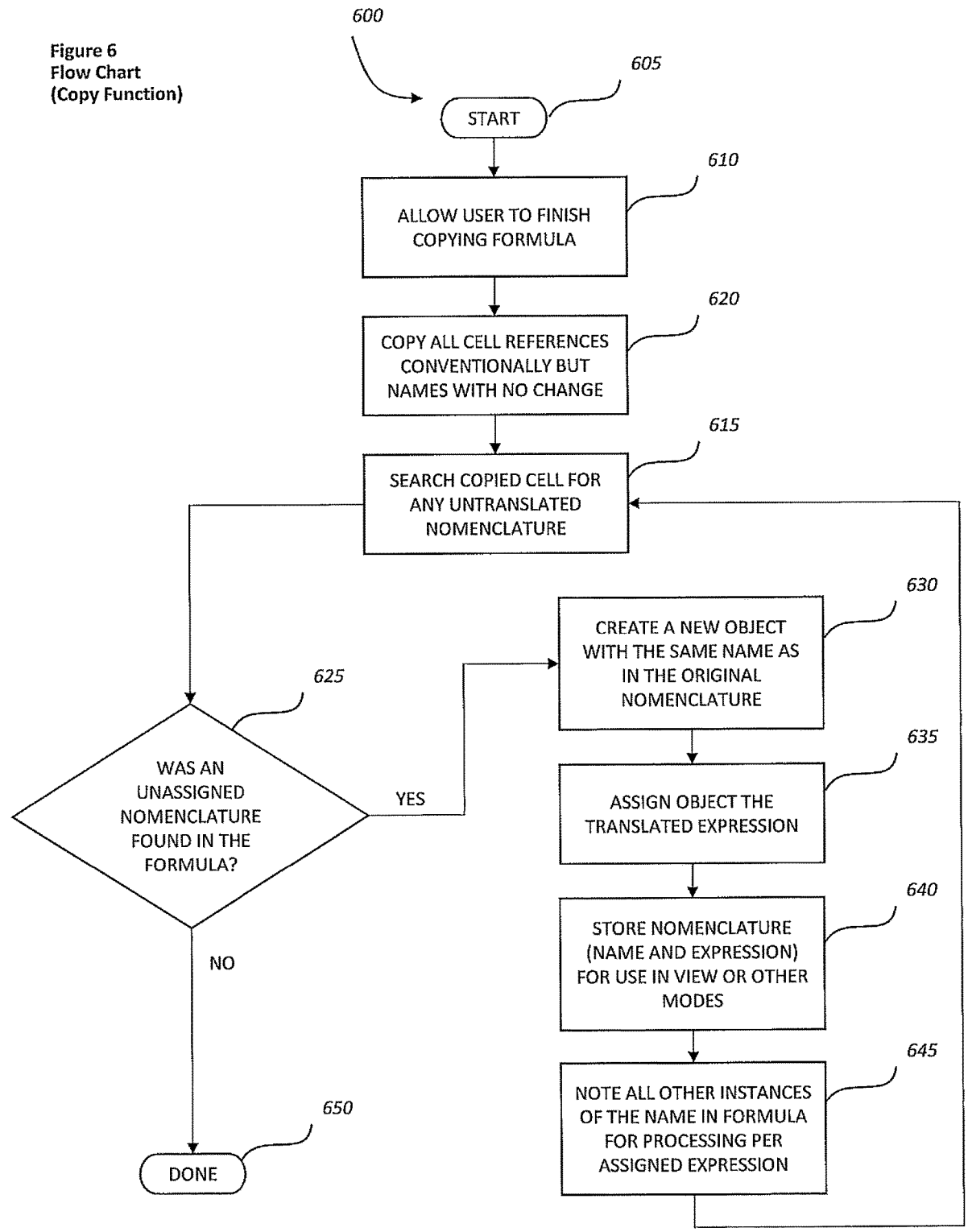
FIG. 6 is a flowchart illustrating an exemplary embodiment of a routine for copying formula that utilize the nomenclature syntax defined according to aspects of the present disclosure.

FIG. 6 is a flow chart showing an illustrative routine for copying cells within a spreadsheet application according to aspects of the present disclosure. For exemplary purposes only, the routine shown in this figure will be described in terms of the spreadsheet example shown in FIG. 7.

The routine 600 begins at start block 605 where the user desires to copy a formula in the spreadsheet from one cell to another cell or group of cells. At block 610, the user completes copying a formula in a spreadsheet cell to another cell. Once the spreadsheet application detects that the user has finished copying the formula, it advances to block 615 where it copies all cell references, including those that are part of a nomenclature, using commonly established rules of relative, absolute or mixed references in a spreadsheet application. However, it copies any nomenclature names with no change. At this point the nomenclature is considered untranslated as the nomenclature syntax has been copied over but not yet processed by the spreadsheet application. Untranslated nomenclatures are those that have not yet been assigned an object with assigned name and assigned expression properties. At block 620, the spreadsheet application searches the copied formula for any untranslated nomenclatures. At block 625, the spreadsheet application checks if an untranslated nomenclature is found in the copied formula. If none is, the program advances to block 650 and no further special action is taken. If an untranslated nomenclature is present in the formula, at block 630, a new nomenclature object is created and assigned the found name, which in this case is the same name as its predecessor object in the original cell that was copied. At block 635, the nomenclature object is assigned the found expression, which in this case is the expression from the original cell that was copied with changes corresponding to the rules of relative, absolute or mixed references as the case may be. Thus in the copied cell, the nomenclature object has the same name but a different expression assigned to it.

It is noted that even though the names of the nomenclature objects in the original and copied cells are the same, they are different from each other for computational purposes and have different properties both from the perspective of the spreadsheet application and the user. The nomenclature within a given cell only describes its properties and relationships within that cell. Thus, the same name in two different spreadsheet cell formulas may refer to distinct expressions that only have relevance in the scope of that cell. At block 640, the assigned nomenclature object is stored for use in accompanying view and other processing modes. Next, at block 645, all other instances of the "name" object in the formula are noted by the spreadsheet application for processing as per the assigned expression. The process, from block 620 to 645 is repeated in a program loop to identify additional nomenclature objects that have not yet been translated until all nomenclatures have been identified and stored with their designated properties.

FIG. 7 shows an example of operation from the perspective of a user copying a formula in a spreadsheet. In the FIG. 7, an example spreadsheet is shown in 700, with data in cells G1 to G3, H1 to H3, and I1 to I3. Cell A1, contains a formula with the computational logic shown in formula bar 705. In an example spreadsheet, under currently prevalent conventions, this formula may be entered as =IF((G1−G2)/G3> (H1−H2)/H3, (G1−G2)/G3, (H1−H2)/H3) as shown in formula bar 705. Under prevalent conventions, when copied from cell A1 to cell B1, the formula in cell B1 becomes = IF((H1−H2)/H3>(H2)/H3, (H1−H2)/H3, (I1−I2)/I3) as shown in the formula bar 706, where those familiar with the art note that cell references have been modified according to conventional rules of relative references.

For implementations consistent with the present disclosure, the user could enter the formula more simply as = IF(((G1−G2)/G3)_X>((H1−H2)/H3)_Y, X, Y) as shown in formula bar 710. When copied from cell A1 to cell B1, the formula would become =IF(((H1−H2)/H3)_X>((I1−I2)/I3)_ Y, X, Y) as shown in formula bar 711. It is to be noted that the copied formula in cell B1 revises all cell references as per the rules of relative references. No change is made to any operand, including the nomenclature operand. Additionally, no change is made to names associated with the nomenclatures. In cell A1, as previously described, the translated nomenclature establishes that X=(G1−G2)/G3 and Y=(H1−H2)/H3. However, in cell B1, the translated nomenclature establishes that X=(H1−H2)/H3 and Y=(I1−I2)/I3. Thus, we see that X has two different relationships in the two different cells, where X=(G1−G2)/G3 in cell A1, but X=(H1−H2)/H3 in cell B1.

In the view mode, cell A1 is seen as =IF(((G1−G2)/G3) x>((H1−H2)/H3)y, x, y) as shown in formula bar 715 and cell B1 is seen as =IF(((H1−H2)/H3)x>((I1−I2)/I3)y, x, y) as shown in formula bar 716. Further, in the enhanced view modes shown in box 720 and box 721, the cell formula becomes elegantly the same, namely, =IF(x>y, x, y) for both cells A1 and B1 highlighting the fact that the logical relationships are identical.

Implementations consistent with the present disclosure also provide the ability to configure the spreadsheet application to automatically find opportunities to simplify a user entered formula using nomenclature objects. FIG. 8 is a flow chart showing an illustrative routine for automatically adding nomenclatures within a spreadsheet application using the aspects of the present disclosure. For exemplary purposes only, the routines shown in this figure will be described in terms of the spreadsheet example shown in FIG. 9.

The routine 800 begins at start block 805 where the user desires to manipulate a formula in the spreadsheet. At block 810, the user completes entering or editing a formula in a spreadsheet cell. Once the spreadsheet application detects that the user has finished entering or editing the formula, it advances to block 815 and searches the user entry for the smallest expression that recurs, or occurs more than once within the formula, but has not already been assigned a nomenclature by the user. At block 820, the spreadsheet application checks if such an unassigned, common expression was found. If none was, the program advances to block 850 and no further special action is taken. If an unassigned, common expression is found in the formula, the spreadsheet application assigns it a unique name, for example X. At block 830, a new nomenclature object, called by the unique name is created and at block 835, assigned the found common expression. At block 840, the assigned nomenclature object is stored for use in accompanying view modes and other processes. Next, at block 845, all other instances of the found expression in the formula are replaced by the spreadsheet application by the nomenclature name. The process, from block 815 to block 840 is repeated in a program loop to identify additional recurring expressions that have not yet been associated with a nomenclature object until all recurring expressions have been identified and assigned a unique nomenclature.

Figure 9:
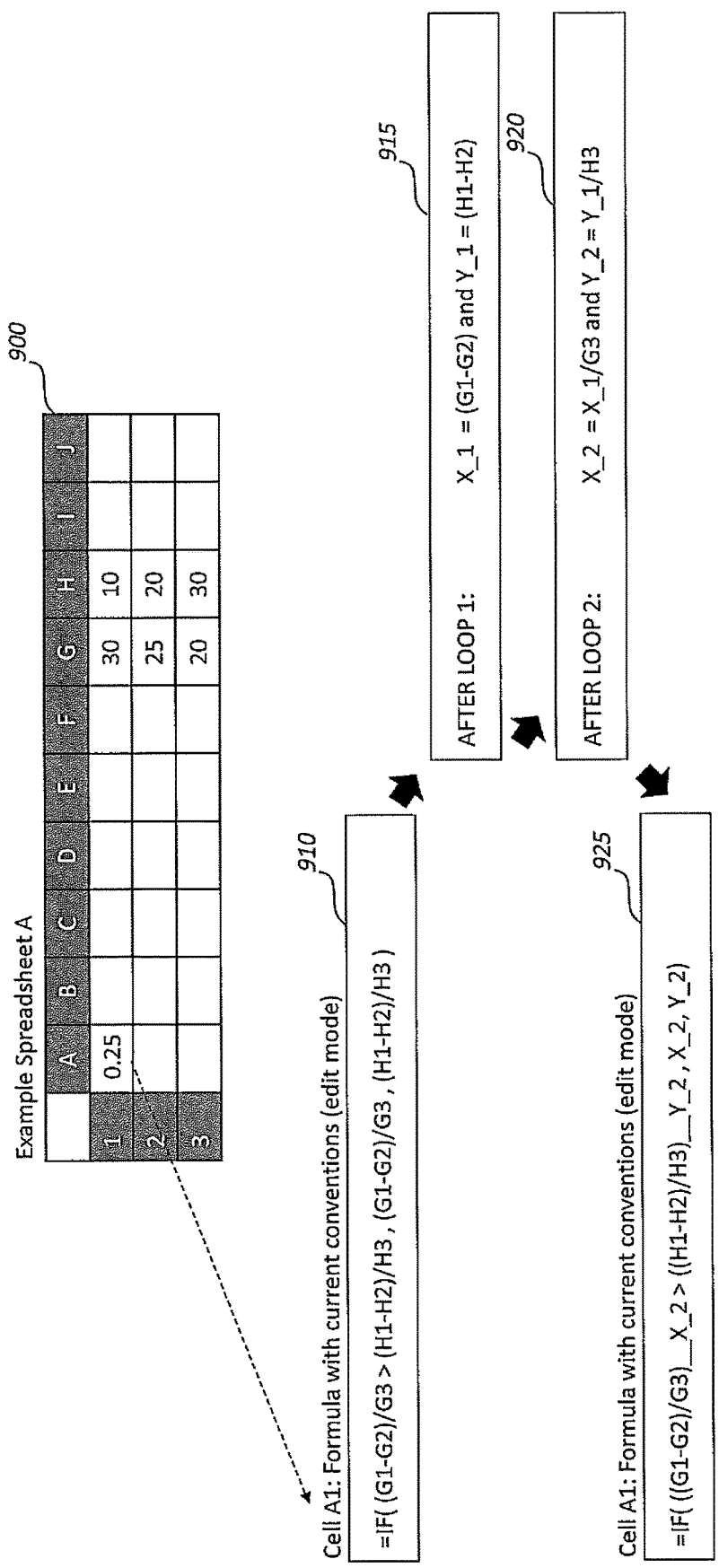
FIG. 9 is a partial spreadsheet diagram reflecting an exemplary embodiment of how a formula written under conventional syntax may be automatically modified to incorporate the new nomenclature using the auto feature according to aspects of the present disclosure.

FIG. 9 shows an exemplary embodiment from the perspective of a spreadsheet user using the automated nomenclature functionality. In formula bar 910, the user enters the formula =IF((G1−G2)/G3>(H1−H2)/H13, (G1−G2)/G3, (H1−H2)/H3). In the first loop of the process 815 to 845, the spreadsheet application finds the two smallest expressions (G1−G2) and (H1−H2) which recur in the formula and assigns them the names X_1 and Y_1 as depicted in block 915. In the second loop, the spreadsheet application finds the two smallest expressions X_1/G3 and Y_1/H3 that recur and assigns them names X_2 and Y_2, as depicted in the box 920. This results in the simplified formula =IF(((G1−G2)/ G3)_X 2>((H1−H2)/H3)_Y_2, X_2, Y_2) as shown in formula box 925. It is noted that implementations consistent with the present disclosure allow for nomenclature names to be part of expressions alone or in combination with cell references, as where X_2=X_1/G3. In this example, it is also noted that nomenclatures X_1 and Y_1, were intermediate nomenclatures created by the program and not visible to the user, that only sees the final result in the formula bar 925. The spreadsheet application may alternatively be set to show the intermediate assignments.

Implementations consistent with the present disclosure also allow users to nest nomenclatures within each other. This means that the expression associated with a nomenclature may not only contain cell references and operands, but also other nomenclatures. This is illustrated by way of an example in FIG. 10 and FIG. 11. The formula is shown in FIG. 10 in both the edit and view modes. The formula is shown in FIG. 11 in both the view and enhanced view modes.

In the formula bar 1005, a user has entered a formula with conventional methods as =IF((G1−G2)/G3−(H1−H2)H3>0, (G1−G2)/G3−(H1−H2)/H3, (G1−G2)/G3+(H1−H2)/H3). The user may enter the formula as =IF((((G1−G2)/G3)_X−((H1−H2)/H3)_Y)_Z>0, Z, X+Y), as depicted in formula box 1010. It is noted that the nomenclature for 'Z', is assigned the expression (((G1−G2)/G3)_X−((H1−H2)/H3)_Y), which in turn is computed as the difference between the values of the two nomenclatures 'X' and 'Y', where 'X' is assigned the expression (G1−G2)/G3 and 'Y' is assigned the expression (H1−H2)/H3 respectively. Thus, in the view mode, the formula in cell A1 may be viewed in its simplified form =IF((((G1−G2)/G3)x−((H1−H2)/H3)y)z>0, z, x+y), as depicted in 1015.

Figure 11:
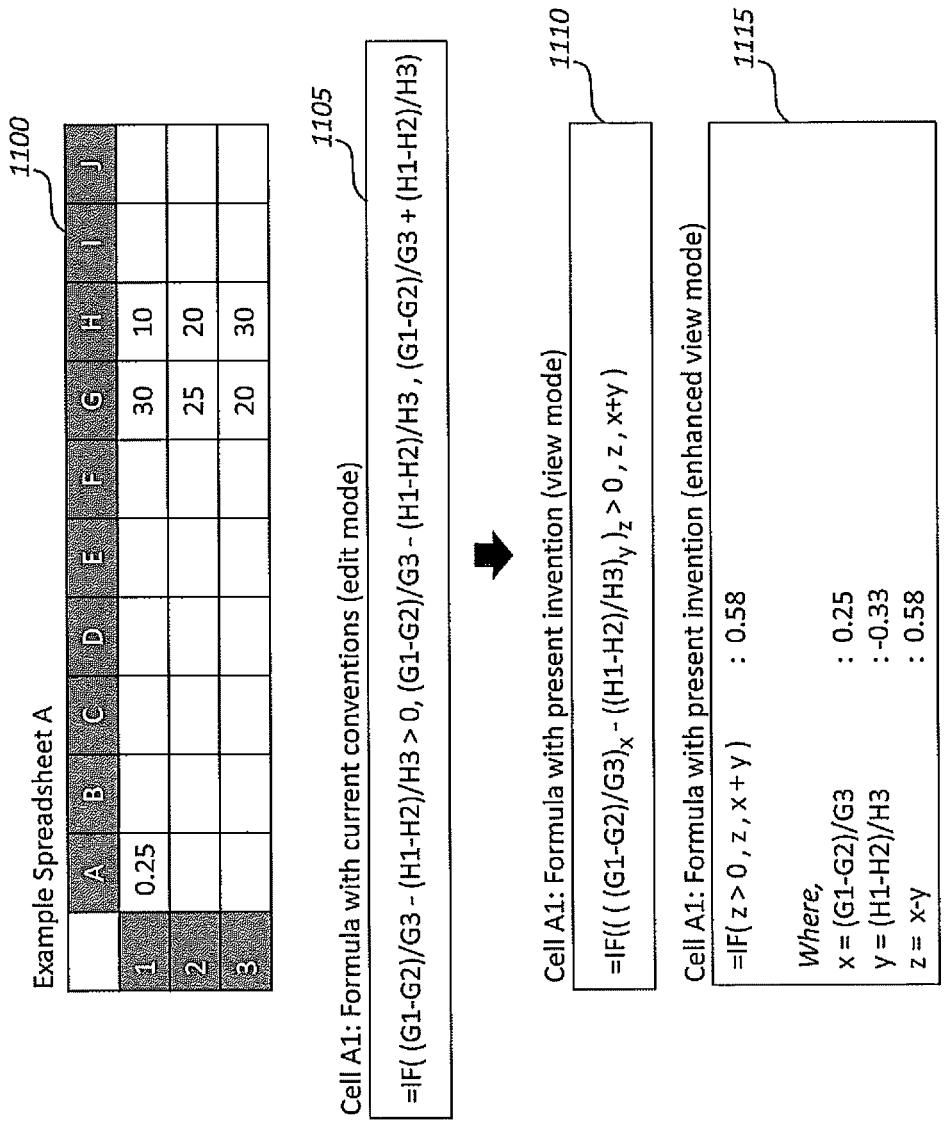
FIG. 11 is a partial spreadsheet diagram illustrating a simple example of the dynamic naming logic applied to expressions within an "IF" formula in the Microsoft Excel syntax using three given names, where nested nomenclature syntax is used.

In FIG. 11, the same spreadsheet 1100 is shown by way of example, along with the user formula in cell A1 under current conventions 1105 and in accordance with the present disclosure in view mode 1110. Further, in the enhanced view mode, following the same example as above with the present disclosure, this formula may be further simplified in multiple lines as depicted in 1115;

=IF(z>0,z,x+y), where
x=(G1−G2)/G3
y=(H1−H2)/H3
z=x−y.

The order in which the equations are displayed may be alphabetically by nomenclature name or in the order of appearance in the formula or other method.

Aspects of the present disclosure may be implemented with as a system of features and functionalities to help users work more effectively with formulas in their spreadsheet application. Some of these features and functionalities are described below by way of illustration and by no means are a complete list.

1. The spreadsheet application can provide down versioning tools whereby the nomenclature objects would be automatically replaced by their assigned expressions in every occurrence in every formula within a spreadsheet. This would allow a user to safely export their spreadsheets containing nomenclatures to versions of their programs that do not have a capability to process nomenclature objects according to aspects of the present disclosure.

2. The spreadsheet application can provide automatic checking for improperly or problematically named nomenclature objects. For example, alerts could signal when a user assigns the same nomenclature name to distinct expressions within a formula, assigns two different nomenclature names to the same expression within a formula, or assigns nomenclature names which are the same as cell references or operands reserved for other purposes in the application, or enters the wrong nomenclature syntax. Not all of these problems result in a processing error but could confuse users.

3. The spreadsheet application can use smaller case letters and subscripts as shown in the example figures for user friendly views.

4. The spreadsheet application can show the enhanced view as an expansion of the formula bar, a side panel or pop-up window or any other form.

5. The spreadsheet application may allow automatic updating of an edited nomenclatures across cells containing the same nomenclature name for the ease of the user. In this case, editing a nomenclature in one cell would give the user the option to immediately modify all occurrences of the nomenclature in all other cells where the nomenclature name recurs and contains relational properties that were created when the cell was copied to or from those cells.

6. The spreadsheet application could allow a review mode where all definitions of the same nomenclature and their locations could be reviewed. In the enhanced view mode, cell formula may be identical across two cells even when the actual relationship is relatively different, given that the nomenclature has relevance only within the scope of a formula. Thus, x=A1+A2 in a formula in cell C1, but x=A1+B1 in a formula in cell C2. Those familiar in the art will note that these definitions of X cannot result from a relative copy and are distinct. This situation can occur frequently in spreadsheet applications, as for example when a rows are copied in a table but the last row needs to be computed distinctly from the other rows. In the review mode, the user would thus be able to see that 'x' has two distinct relative definitions and be notified of their location.

7. The spreadsheet application can allow for the creation of absolute references that have meaning across the cells beyond itself. An absolute reference could be created by using a different operand by, for example, using an underscore and a dollar character '_$' in succession instead of two underscore characters "_". In this case, the nomenclature created would refer to the same expression no matter where it is copied. Thus, the nomenclature syntax (A1+A2)_$X in a formula in cell C1, would result in the relationship x=A1+A2. When the cell C1 is copied to cell C2, the nomenclature in C2 would have the relationship x=A1+A2. Had the nomenclature syntax been (A1+A2)_X in the formula in cell C1, when copied to cell C2, the nomenclature in the formula in cell C2 would be x=B1+B2 as described extensively in the detailed description.

Figure 12:
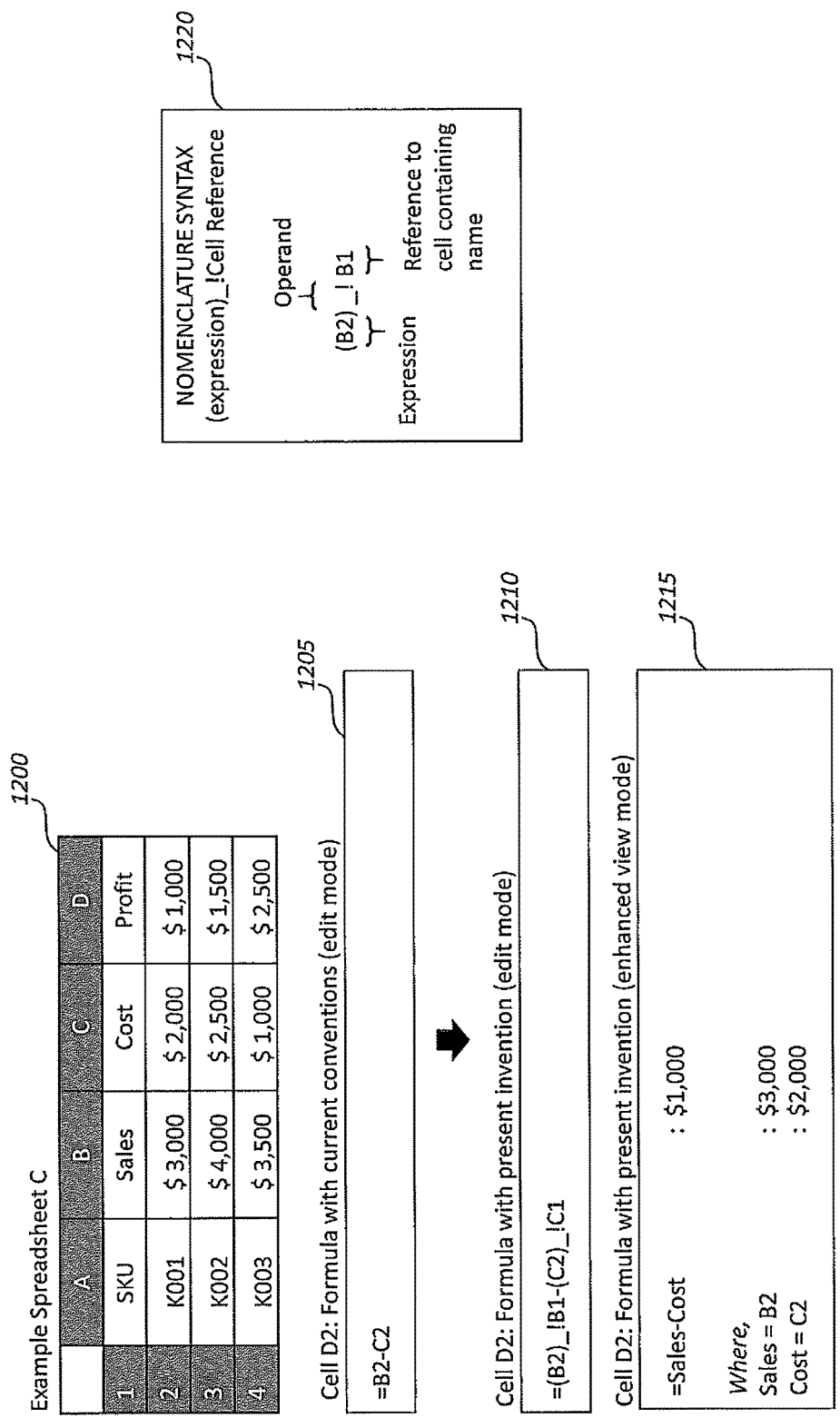
FIG. 12 is a partial spreadsheet diagram illustrating a simple example of the dynamic naming logic applied with a modified operand whereby the name of the nomenclature object is referred to as residing in a different cell instead of being specified in the nomenclature syntax itself.

8. The spreadsheet application can allow for the use of cell references in place of a name in the nomenclature syntax. This can be done simply by using a modified operand, for example, using an underscore character "_" and an exclamation character '!' in succession as '_!' instead of two underscore characters "_". In this case, the name to be used with the nomenclature object would be found in the cell referenced. This results in a nomenclature syntax in the form of '(expression)_!cell reference'. This is illustrated in FIG. 12, where 1200 shows an example spreadsheet C with 4 columns depicting a SKU (stock keeping unit), its Sales, Costs and Profits. Profits are computed as the difference between the Sales of a given SKU and its Costs. Thus, as shown in 1205, the formula in cell D2 would compute the profit for SKU K001 under current conventions as simply '=B2−C2'. According to aspects of the present disclosure, this formula could be enhanced for readability by entering it as '(B2)_!B1−(C2)_!C1, as shown in 1210. Box 1220, explains the modified syntax further, where the modified operand '_!' is used and the name to be used with the nomenclature object is found in cell B1, namely as 'Sales'. The formula in cell D2 would thus be viewed in the enhanced view mode as simply 'Sales-Cost' which intuitively corresponds to 'Profit'. In fact, when the formula is copied from cell D2 to cells D3 and D4, it would still be viewed in the enhanced view mode as Sales-Cost' in each of those cells. In the standard view mode, it would be seen in cell D2 as '=(B2)Sales−(C2)Costs' which is also intuitively appealing.

One or more aspects of the present disclosure may be applied without limitation to database programs, project management programs, and/or word processing programs and other applications which require the use of complex calculations and formulas. For example, a new field may be a calculated expression drawing of other fields in a database and other functions. By applying the nomenclature object, a user may be able to simplify the entry of the formula without having the nomenclature name interfering with other fields with the same name.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method for computing a formula in a cell in an electronic data processing application, the electronic data processing application selected from a set consisting of a database program, a project management program, a word processing program, and an electronic spreadsheet program, the data processing application implementing a plurality of cells, the method comprising:
    searching at least a portion of a formula in a first cell within the plurality of cells to find a symbol in the formula for associating a first name in the formula with a first expression in the formula, the first expression having a first result;
    assigning the first name to the first expression having the first result; and
    utilizing the first expression having the first result to evaluate a subsequent instance of the first name in the formula to compute a final result of the first cell;
    wherein assignment of the first name to the first expression having the first result is made in relation to the first cell and not in relation to any other cell of the data processing application that has the first name in a formula therein so that the assignment has no relevance outside of the first cell in any other cell of the data processing application.

2. The method of claim 1, wherein the first expression having the first result is utilized for all subsequent instances of the first name in the formula of the first cell when computing the formula to determine the final result of the first cell.

3. The method of claim 1, further comprising:
    receiving a request to copy the formula in the first cell to a second cell;
    automatically modifying the first expression in accordance with a formula copying operation of the electronic data processing application to create a second expression, but not modifying the first name or the symbol, to create a modified formula for the second cell, the modified formula comprising the second expression, the first name, and the symbol;
    assigning the first name to the second expression having a second result; and
    utilizing the second expression having the second result to evaluate a subsequent instance of the first name in the modified formula to determine a final result of the second cell.

4. The method of claim 1, wherein the formula in the first cell is a user-entered formula comprising the first name and the first expression, and assigning the first name to the first expression having the first result is performed in response to a user entering the formula in the first cell.

5. The method of claim 1, wherein the method further comprises:
    searching at least a portion of a formula in a second cell within the plurality of cells to find the symbol, the formula in the second cell comprising the first name and a second expression, the second expression being different from the first expression, the symbol in the second cell associating the first name with the second expression, the second expression having a second result;
    assigning the first name to the second expression having the second result; and
    utilizing the second expression having the second result to evaluate a subsequent instance of the first name in the formula in the second cell to compute a final result of the second cell;
    wherein assignment of the first name to the second expression having the second result is made in relation only to the second cell so that the assignment of the first name to the second expression having the second result has no relevance to the first cell.

6. The method of claim 1, further comprising:
    automatically identifying common expressions in the formula;
    for each identified common expression, automatically assigning a respective name to the identified common expression;
    automatically modifying the formula to include the symbol and the respective name for a first instance of each common expression; and
    for subsequent instances of each common expression, replacing the respective name for the common expression.

7. The method of claim 1, wherein assignment of the first name to the first expression is nested within assignment of a second name to a second expression, the second expression comprising the first expression.

8. The method of claim 1, wherein assigning the first name in the formula to the first expression comprises obtaining the first name from contents of a referenced cell associated with the symbol.

9. The method of claim 1, wherein the symbol is a unique operand symbol in the formula signaling to a formula processor that the first expression within the formula in the first cell is associated with the first name, and the first name is in a predetermined relationship to the operand symbol.

10. A computing device for providing dynamic naming of component expressions, the computing device comprising:
    a processor; and
    memory coupled to the processor, the memory storing at least a program executable by the processor to provide an electronic data processing application, the electronic data processing application selected from a set consisting of a database program, a project management program, a word processing program, and an electronic spreadsheet program, the data processing application implementing a plurality of cells, the at least a program, when executed by the processor, causes the processor to perform the following steps:
    search at least a portion of a formula in a first cell of the electronic data processing application to find a symbol in the formula for associating a first name in the formula with a first expression in the formula, the first expression having a first result;
    assigning the first name to the first expression; and utilize the first expression having the first result to evaluate a subsequent instance of the first name in the formula to compute a final result of the first cell;

wherein assignment of the first name to the first expression having the first result is made in relation to the first cell and not in relation to any other cell of the electronic data processing application that has the first name in a formula therein so that the assignment has no relevance outside of the first cell in any other cell of the data processing application.

11. The computing device of claim 10, wherein, when executed by the processor, the at least a program further causes the processor to:
accept entry into the first cell, by a user, of the formula, the formula comprising the first name and the first expression; and
in response to entry of the formula into the first cell by the user, assign the first name to the first expression having the first result.

12. The computing device of claim 10, wherein, when executed by the processor, the at least a program further causes the processor to utilize the first expression having the first result for all subsequent instances of the first name in the formula when computing the formula to determine the final result.

13. The computing device of claim 10, wherein, when executed by the processor, the at least a program further causes the processor to store an object for assigning the first name to the first expression having the first result, and the object relates only to the first cell.

14. The computing device of claim 10, wherein, when executed by the processor, the at least a program further causes the processor to:
receive a request to copy the formula in the first cell to a second cell;
automatically modify the first expression in accordance with a formula copying operation of the electronic data processing application to create a second expression, but not modifying the first name or the symbol, to create a modified formula for the second cell, the modified formula comprising the second expression, the first name, and the symbol;
assign the first name to the second expression, the second expression having a second result; and
utilize the second expression having the second result to evaluate a subsequent instance of the first name in the modified formula to determine a final result of the second cell.

15. The computing device of claim 10, wherein:
searching the at least a portion of the formula in the first cell of the electronic data processing application to find the symbol in the formula comprises searching the formula to find each instance in the formula of a unique operand symbol; and
assigning the first name to the first expression comprises:
obtaining name information referenced at a first location with respect to the operand symbol; and
obtaining an expression in the formula that is referenced at a second location with respect to the operand symbol.

16. The computing device of claim 10, wherein, when executed by the processor, the at least a program further causes the processor to:

search at least a portion of a formula in a second cell within the plurality of cells to find the symbol, the formula in the second cell comprising the first name and a second expression, the second expression being different from the first expression, the symbol in the second cell associating the first name with the second expression, the second expression having a second result;

assign the first name to the second expression having the second result; and utilize the second expression having the second result to evaluate a subsequent instance of the first name in the formula in the second cell to compute a final result of the second cell;

wherein assignment of the first name to the second expression having the second result is made in relation only to the second cell so that the assignment of the first name to the second expression having the second result has no relevance to the first cell.

17. The computing device of claim 10, wherein, when executed by the processor, the at least a program further causes the processor to replace the formula in the first cell with a modified formula in which the symbol and the first name associated with the symbol are not present and all subsequent instances of the first name in the formula are replaced by the first expression.

18. The computing device of claim 10, wherein, when executed by the processor, the at least a program further causes the processor to determine the first name by obtaining the first name from contents of a referenced cell associated with the symbol.

19. The method of claim 1, wherein the method is implemented as: an add-on to a spreadsheet application, a macro, a function, or a modification to software driving the electronic data processing application.

20. A non-transitory computer-readable media comprising program code executable by a processor to cause the processor to perform steps comprising:
searching at least a portion of a formula in a first cell of an electronic data processing application, the electronic data processing application selected from a set consisting of a database program, a project management program, a word processing program, and an electronic spreadsheet program, the electronic data processing application implementing a plurality of cells, to find a symbol in the formula for associating a first name in the formula with a first expression in the formula, the first expression having a first result;
assigning the first name to the first expression; and
utilizing the first expression having the first result to evaluate a subsequent instance of the first name in the formula to compute a final result of the first cell;
wherein assignment of the first name to the first expression having the first result is made in relation to the first cell and not in relation to any other cell of the data processing application that has the first name in a formula therein so that the assignment has no relevance outside of the first cell in any other cell of the electronic spreadsheet.

* * * * *